F. M. SPIEGLE.
LANDING NET FRAME.
APPLICATION FILED APR. 26, 1909.
941,961.
Patented Nov. 30, 1909.
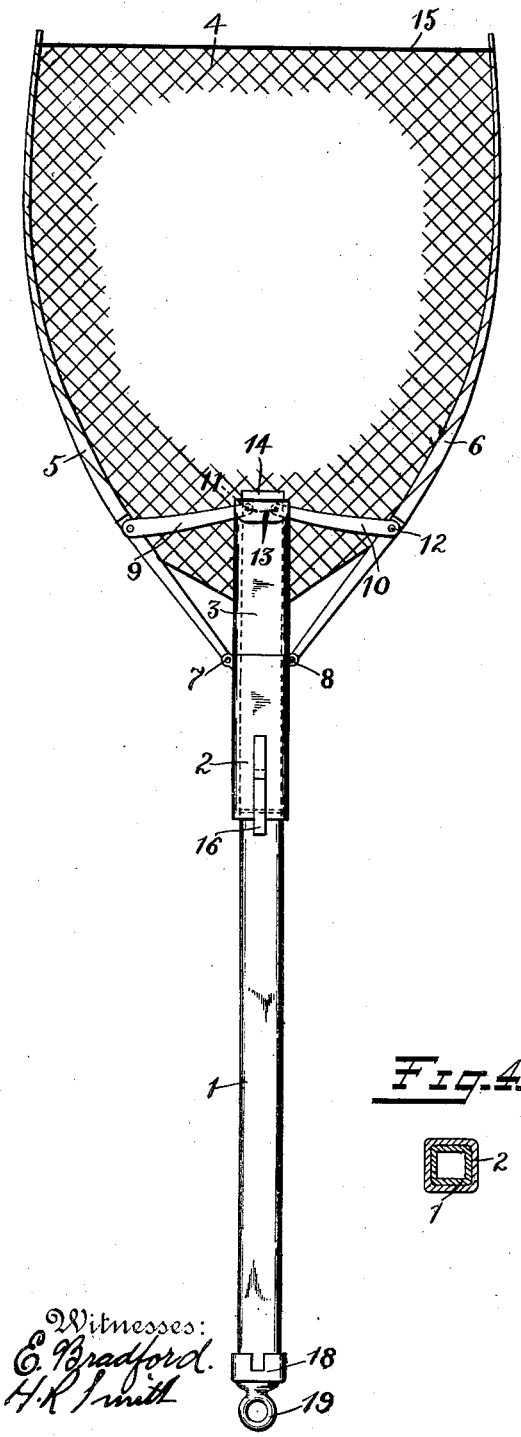
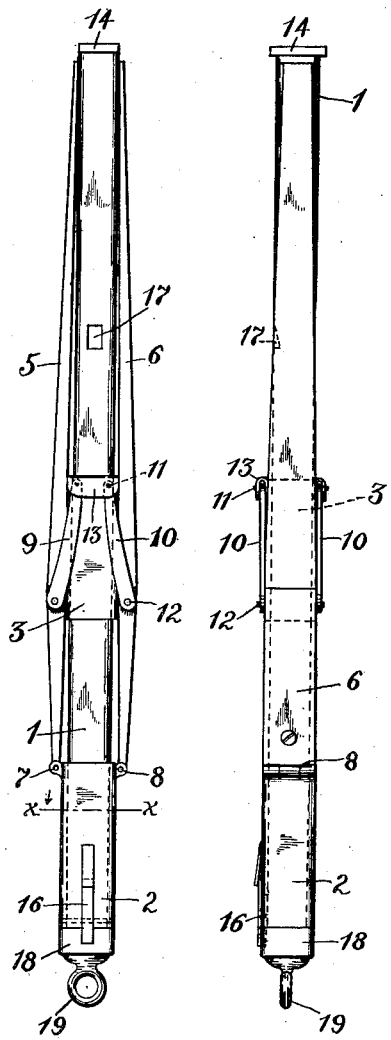
Witnesses:
E. Bradford.
H. K. Smith.
Inventor
Frederick M. Spiegle
By his Attorney

UNITED STATES PATENT OFFICE.

FREDERICK M. SPIEGLE, OF NEW YORK, N. Y.

LANDING NET-FRAME.

941,961.  Specification of Letters Patent.  Patented Nov. 30, 1909.

Application filed April 26, 1909. Serial No. 492,349.

*To all whom it may concern:*

Be it known that I, FREDERICK M. SPIEGLE, a citizen of the United States, residing at New York, in the county of New York and State of New York, have invented certain new and useful Improvements in Landing Net-Frames, of which the following is a specification.

My invention relates particularly to collapsible net frames.

The object is to provide a simple and light construction which is compact when collapsed and which may be readily and quickly distended for use.

It is particularly designed for landing fish from brooks, although its use is of course not so limited.

A number of constructions have been proposed having folding handles or folding arms or removable handles. I therefore do not broadly claim a collapsible net.

My invention consists in a structure as illustrated in the accompanying single sheet of drawings and described in the following specification.

Figure 1, is a front view of a net and frame embodying the improvements of my invention shown distended and ready for use. The net proper is only suggested in this figure however. Fig. 2, is a front view of the frame collapsed or shut up for convenience in carrying. Fig. 3, is a side view of the same. Fig. 4, is a section on the line X X of Fig. 2.

The handle 1 is preferably angular in cross section, for instance, square as shown but with rounded corners and made of light material such as a tube of aluminum. Upon this handle two sleeves 2 and 3 are adapted to slide freely longitudinally. These may be conveniently constructed, for instance, of sections of light brass tubing.

The fabric or net proper 4 is of any suitable type and may be secured to the arms 5 and 6 in any suitable manner. These arms are constructed of suitable material such for instance, as strips of seasoned ash and are hinged to the sleeve 2 at points 7 and 8 respectively.

Each arm is connected by a pair of links such as 9 and 10, 10 to the outer end of sleeve 3. Only one of the links connecting arm 5 to sleeve 3 is shown, but the pair is similar to the pair 10, 10. Each link is pivoted at its opposite ends as at 11 and 12. Lip 13 turned down from the end of sleeve 3 carries pivot 11.

The outer end of the handle 1 is provided with a stop 14 which extends laterally from the handle but only a short distance so that there will be no obstruction to longitudinal movement of the arms in distending the same. The outer ends of the arms are preferably connected by means of a cord 15 of such length that when the frame is distended the arms are bowed as shown in Fig. 1 thus giving greater stiffness.

A pivoted spring pressed catch 16 carried by the sleeve 2 engages a recess 17 in the handle to hold the frame distended. The length of sleeve 3 is such that it acts as an abutment for sleeve 2 in distending the parts when the links 9 and 10 project at a little less than 90° from the handle. The other end of the handle is provided with a stop 18 which prevents the parts of the frame from being drawn off the handle when the frame is collapsed. A ring or eye 19 may be used for more conveniently engaging the end of the handle.

Normally the net is carried with the frame collapsed as shown in Figs. 2 and 3. When it is desired to use the net the sleeve is held in one hand and the handle is grasped with the other and pulled toward you. When the stop 14 strikes the sleeve 3 it pulls the sleeve along with it and thus forces the arms 5 and 6 outward until the bottom of sleeve 3 strikes the top of sleeve 2. The catch 16 then snaps into recess 17 and locks the parts in position with the frame and net distended. When it is desired to shut up the net the handle of catch 16 is pressed down so as to release the catch. The spring of the arms 5 and 6 is sufficient to force the sleeve 2 downward on the handle a short distance so that the catch 16 is entirely freed from the recess and the net can thus be easily collapsed with one hand. In order to facilitate opening or distending the net the axis of the pivot 12 should be considerably outside the straight line connecting the pivots 3 and 11. There will then be no difficulty in distending the frame by simple longitudinal pressure upon the sleeve 2. The net fabric may be wound or coiled around the closed frame for compactness in carrying.

What I claim is:

1. A landing net frame comprising a handle, two sleeves slidable thereon, a stop at each end of the handle, a pair of arms hinged to the inner sliding sleeve, a link pivotally connecting each arm to the outer sliding sleeve and a cord connecting the outer ends of the arms, the proportions of the parts being such that the arms are somewhat bowed when distended but lie against the handle throughout substantially their entire lengths when shut up.

2. A landing net comprising, a handle, a pair of sleeves slidable thereon, a stop at each end of the handle, a pair of arms hinged to the inner sleeve, a link pivotally connecting each arm to the outer sleeve, said outer sleeve abutting against the stop at the outer end of the handle and said inner sleeve abutting against said outer sleeve when the arms are distended.

3. A landing net comprising, a handle, a pair of sleeves slidable thereon, stops therefor, a pair of arms hinged to the inner sleeve, links connecting the arms to the outer sleeve and a catch for holding the inner sleeve when the arms are distended.

FREDERICK M. SPIEGLE.

Witnesses:
E. W. McGuire,
Francis A. Castellano, Jr.